Oct. 4, 1949.                J. LEVIN                 2,483,833
                             TOY BLOCKS
Filed April 22, 1946                              2 Sheets-Sheet 1
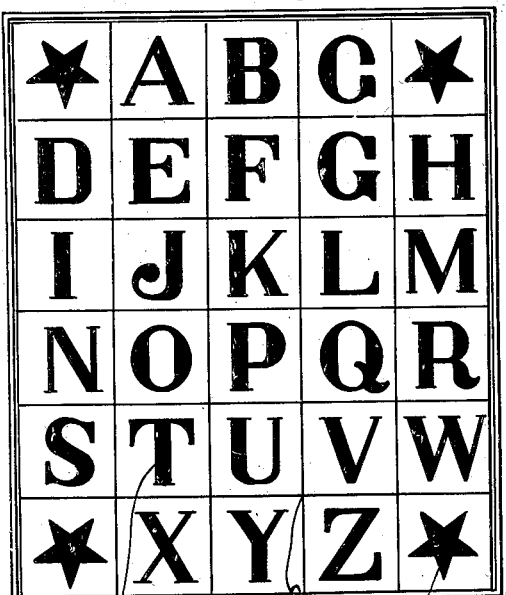
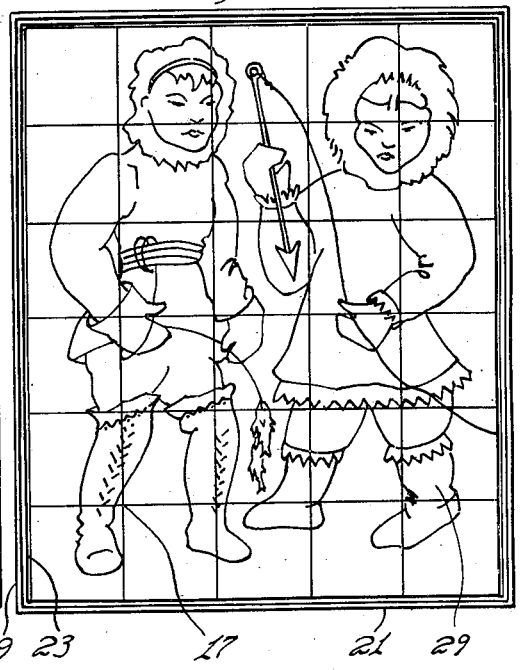
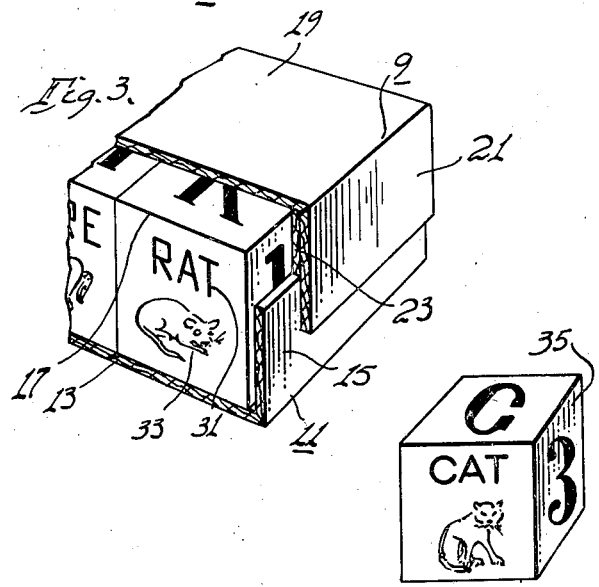
WITNESSES:                                        INVENTOR
                                                  Jacob Levin.
                                              BY
                                                  Hymen Diamond.
                                                      ATTORNEY Oct. 4, 1949.  J. LEVIN  2,483,833
TOY BLOCKS
Filed April 22, 1946  2 Sheets-Sheet 2
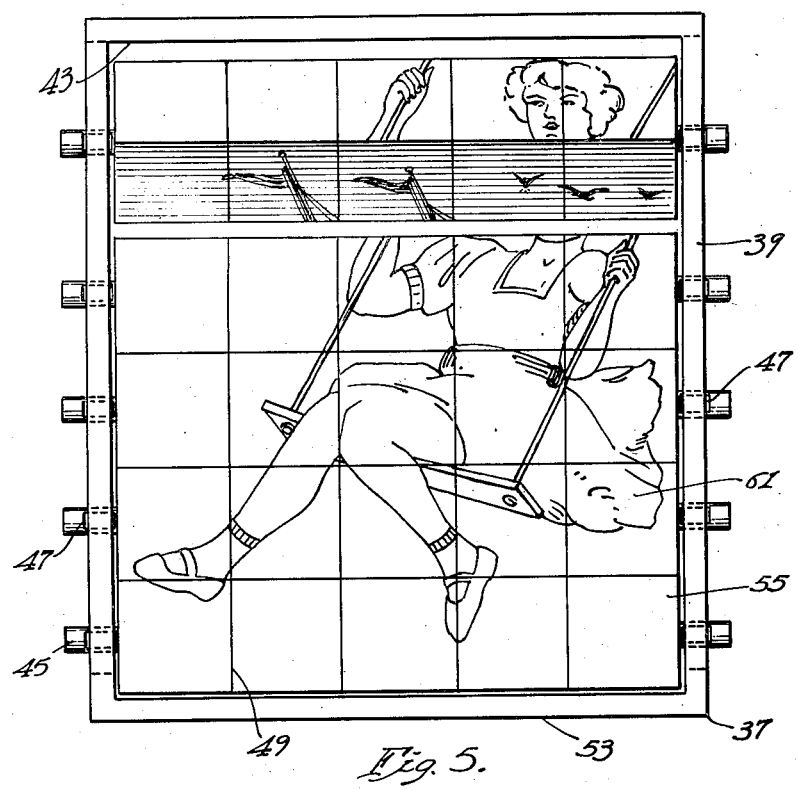
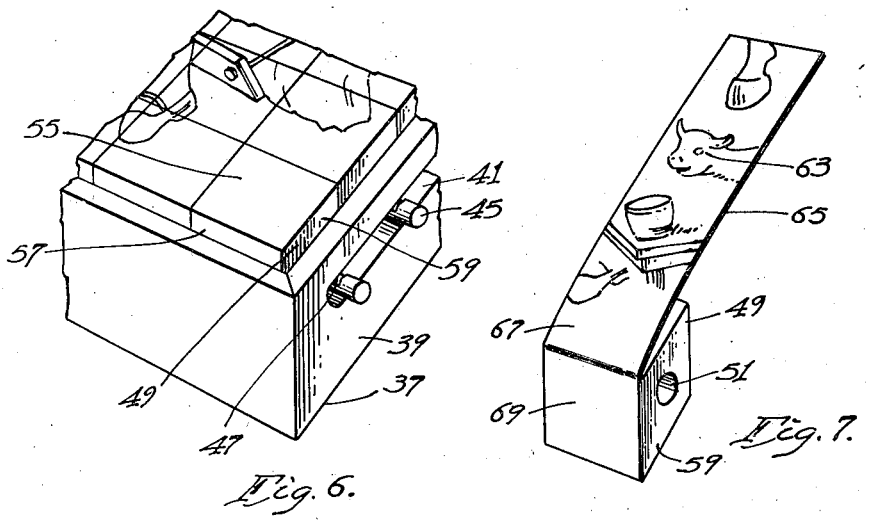
WITNESSES:
INVENTOR
Jacob Levin.
BY
Hymen Diamond
ATTORNEY Patented Oct. 4, 1949

2,483,833

UNITED STATES PATENT OFFICE 2,483,833

TOY BLOCKS

Jacob Levin, Pittsburgh, Pa., assignor of one-fourth to Abe E. Fineman and F. Esther Fineman, and fifteen per cent to Hymen Diamond, all of Pittsburgh, Pa.

Application April 22, 1946, Serial No. 663,922

2 Claims. (Cl. 35—71)

My invention relates to toys for children and has particular relation to blocks.

A set of blocks having designs or letters on their faces constitutes an unusually satisfactory toy for entertaining children. Blocks are of simple structure; yet, because they may have numerous different designs on their different faces, afford the variety essential in holding a child's interest. Blocks may be composed of wood, composition material or plastics and may be given a smooth finish. There are, accordingly, no cutting edges or splinters to injure a child. Blocks may be of such large dimensions that even a child with a large mouth cannot swallow a block; nor can a child insert a block into its nose or into its ears.

It is desirable that blocks shall serve not only for entertainment but also to educate the child. For this purpose the patterns impressed on the faces of the blocks constructed in accordance with the teachings of the prior art include letters of the alphabet or numbers. Sometimes letters and symbols illustrating the letters are included. Blocks of this type are shown in Patent No. 557,307 to R. W. Foster.

Prior art blocks are not entirely satisfactory. A letter of the alphabet or a number is an arbitrarily assigned symbol. Retention of the form of the letter in the mind so that it may later be recognized or reproduced is a feat of pure memory. A child playing with prior art blocks perceives the letters or numbers impressed on them as independent symbols. An older person may show the child how the arbitrary symbols on the blocks are related. The child's apprehension of the relationship and its recognition of this relationship will depend on its memorizing the relationship. Thus, use of the blocks tends to develop only the memory.

It is an object of my invention to provide block-game apparatus for educational and entertainment purposes the use of which shall involve other mental functions than pure memory.

Another object of my invention is to provide block-game apparatus, the entertainment and the educational facilities of which shall be so co-related that the educational purposes of the apparatus shall be aided by its entertainment features.

A further object of my invention is to enhance the entertainment facilities of block-game apparatus by extending and improving its educational facilities.

An ancillary object of my invention is to provide block-game apparatus, in which the patterns on different blocks have a dependency which may be perceived visually by a young child.

Another ancillary object of my invention is to provide a toy block, the manufacture of which, in large quantities, shall involve a simple and inexpensive process.

My invention arises from the realization that the educational purpose served by blocks is improved, and their entertainment value enhanced, by introducing the associative mental function in their use. A necessary concomitant to association is reasoning. While letters of the alphabet or numbers are arbitrarily assigned symbols which a child can identify in his mind only by pure memory, patterns such as pictures are recognized by the child from their content. In accordance with my invention, sections of pictures are associated with the letters or numbers impressed on the individual blocks in such manner that a child will, in his mind, associate a predetermined sequence of letters with portions of a unitary picture. In observing the relationship between the letters and the sections of pictures, the child will develop rudimentary reasoning processes at an early age.

The letters or other arbitrary symbols are impressed on two or more of the faces at right angles to each other of a block constructed in accordance with my invention. On each of the respective faces parallel to faces with the arbitrary symbols, sections of a unitary pattern or picture are impressed. The sections are so related that, if the blocks are arrayed with the letters or numbers in the proper alphabetic or numerical sequence respectively, the sections on the faces opposite to those with the letters or numbers will combine to form a unitary pattern. Vice versa, if the blocks are arrayed so that they combine to form the picture and the array turned over, the letter or number sequence will be displayed. Each block may have impressed on one face, a capital letter of the alphabet; on one of the faces at right angles to the latter, a word in which a letter of the alphabet is the first letter together with pictures illustrating the word; and on the face at right angles to the latter faces, a number in a sequence of numbers, for example, 1, 2, 3, etc., or 1, 10, 100, etc. The faces opposite the faces with the letters, words and numbers, respectively, may have impressed on them, sections of pictures.

For a full understanding of the invention, the accompanying drawing in connection with a detailed description of embodiments are presented. In the drawing:

Figure 1 is a view in top elevation of an array of blocks in accordance with my invention;

Fig. 2 is a view in top elevation of the array shown in Fig. 1 reversed.

Fig. 3 is a view in perspective showing a section of a container for blocks used in the practice of my invention;

Fig. 4 is a view in perspective of one of the blocks in the array shown in Fig. 1;

Fig. 5 is a view partly in top elevation and partly in perspective of a modification of my invention;

Fig. 6 is a view in perspective showing a portion of the modification shown in Fig. 5; and Fig. 7 is a view in perspective illustrating the construction of a block in accordance with my invention.

The block game shown in Figs. 1 to 3 comprises a rectangular container consisting of top and bottom sections 9 and 11, respectively. The container may be composed of wood, cardboard, phenolic, thermoplastic or other suitable material. The bottom section 11 of the container consists of a rectangular base 13 from the four sides of which side walls 15 extend perpendicularly. The dimensions of the bottom section are such that it is filled by an array of thirty cubical blocks 17 disposed in it side-by-side in rows five deep and in columns six deep. The area of the base 13 of the bottom section 11 is sufficiently large to permit any block 17 in the array when complete to be removed with facility. The area of the base 13 is not, however, so large that with the thirty blocks 17 in the lower section 11, the spaces between any block and its neighboring blocks are conspicuous. The height of the side walls 15 is approximately ½ to ⅔ the linear dimension of the block 17.

The top section 9 of the container comprises a base 19 of linear dimensions larger than the base 13 of the bottom by approximately twice the thickness of the walls. From the base 19 side walls 21 extend; the walls 21 are of the same height as the walls 15 of the bottom section. A strip 23 of sheet material equal in thickness to the thickness of the walls 15 extends around the periphery of the base 19 perpendicular to the base and is secured to the wall 21. The height of the strip 23 is slightly greater than the difference between the dimension of the block and the height of the wall 15. When the top section 9 is placed over the blocks 17 arrayed in rows and columns, the strip 23 engages the top rim of the wall 15 as a shoulder and the wall 21 extends over the wall 15 as a skirt.

On one of its faces, each of twenty-six of the blocks 17 has impressed a different letter 25 of the alphabet. Star symbols 27 are impressed on the corresponding faces of the remaining blocks. A section 29 of a unitary picture is impressed on the face of each block opposite to the face bearing the alphabet. The sections 29 on different blocks are so related that if the blocks are arrayed with the letters in the proper alphabetic sequence, the sections 29 combine in the manner of a "jig-saw" puzzle to form the unitary picture.

On one of the faces of each block which is perpendicular to the face shown in Figs. 1 and 2, a word 31 and a picture 33 illustrative of the alphabet are impressed. On the face opposite to the face bearing the word and picture, sections of another unitary picture or pattern are impressed. On a third face, perpendicular to the faces shown in Figs. 1 and 2, numbers 35 one to thirty are impressed, and on the opposite face, sections of a third unitary picture or pattern are impressed. The sections of the pictures on the faces perpendicular to faces shown in Figs. 1 and 2 combine to form unitary pictures when the blocks are arrayed with the words and pictures in the proper alphabetic sequence or the numbers in numerical sequence.

When a child is using the blocks it may first array them in the bottom section 11 with the letters 25 in alphabetic sequence for example. The child may then place the top section 9 over the blocks 17 and invert the container. When the bottom section 11 is now removed, the picture or pattern corresponding to the alphabetic sequence is displayed. Conversely, the child may assemble the blocks to form the picture in the bottom section 11 (or top section 9) and then cover the array and invert it to display the alphabetic sequence.

The game shown in Figs. 5 and 6 comprises a rectangular framework 37 of wood, plastic or other suitable material. Two parallel sides 39 of the framework are slotted. The slot 41 in each side extends from a point near one end of the side 39 throughout the remaining length of the side. At the remaining end, the slot is closed by the side 43 of the framework 37 perpendicular to the slotted sides.

In the slots 41, a plurality of pins 45 are slidably supported. The linear cross-sectional dimension of each pin is slightly larger than the width of the slot. Near each end each pin is provided with a flattened section 47 of length slightly greater than the thickness of the wall of the framework. At the flattened section 47, the cross sectional dimension of the pin 45 is sufficiently reduced to permit it to slide freely along the slot 41 while it is unable to rotate.

On each pin 45, a row of blocks 49 are rotatably supported. The pin passes through a hole 5 extending between two parallel faces of each of the blocks at their geometric centers.

In constructing the toy, the frame 37 is first assembled less the side 43 which closes the slot 41. The blocks 49 are then assembled in rows on the pins 45 and the pins are slipped into the slots through the openings in the slots. The side 43 is then secured to the sides 39 and closes the slots.

Alternative constructions of the frame and block assembly are available. For example, the pins may be constructed with the flattened ends separable from the central portion but provided with studs to fit tightly in holes in the ends of the central portion. In this case, the blocks are assembled on the central portions of the pins; the pin-portion and block assemblies are then positioned properly within the framework in a jig and the studs on the ends of the pins inserted through the slots into the holes in the ends of the center portions of the pins and forced into the holes.

Twenty-five blocks 49 are mounted in the frame 37 in rows five deep by columns five deep. The slotted sides 39 of the frame is sufficiently longer than the aggregate length of a column of blocks to permit the blocks on any pin to be rotated freely about the pin. For the upper row of blocks this object may be accomplished by sliding the upper pin upward to a position such that the blocks on this pin clear the upper side of the frame and the blocks in the second row when the blocks in the upper row are rotated. To rotate blocks in any lower row, the pins supporting the blocks in the rows above it are moved upward until the blocks in the upper row are in contact with the upper side 43 of the frame and the blocks in the succeeding rows are in contact with the blocks in the row above them. The pin holding the blocks to be rotated is then moved upward to a position such that it clears the blocks directly below it and the blocks directly above it. The unslotted sides 43 and 53 are sufficiently longer than the aggregate length of a row of blocks to permit rotation of one block in a row without affecting the others.

On two perpendicular faces 55 and 57 of the four faces of each block which are perpendicular to the faces 59 through which the pins 45 pass, sections 61 of a unitary picture or pattern are impressed. On the faces opposite to the faces 55 and 57, letter or number sequences are impressed. When the blocks are placed in an array and rotated to a position such that the proper faces are outward, a unitary pattern as shown in Fig. 5 is displayed on one side of the framework and an alphabetic or a numerical array on the other.

The modification of my invention shown in Figs. 5 and 6 is not limited to an assembly in which symbols of a sequence are combined with sections of a unitary picture. Sections of a picture may be impressed on all four available sides of each of the blocks and thus four patterns may be available.

The practice of my invention preferably involves blocks on the faces of which colored pictures or patterns are impressed. The printing of colored diagrams and pictures on the faces of blocks involves manufacturing difficulties. I have, accordingly, developed a simple and inexpensive expedient for impressing colored pictures and diagrams on the face of blocks. The expedient is illustrated in Fig. 7.

The patterns 63 or pictures to be impressed on the faces of a block 49 are first impressed on a web 65 such as a strip of paper or composition. The width of the web 65 is equal to the length of the linear dimension of the block. The patterns or pictures are printed in successive equally spaced sections 67 along the web each section having a length also equal to the dimension of the block 49. The web is also provided with a clear square 69.

The clear square 69 is first secured to one face of the block 49 by means of an adhesive such as a suitable glue. The strip is then wrapped around the block and each of the squares bearing a pattern or picture 63 is secured to the corresponding face of the block.

It is to be understood that although certain illustrative embodiments of the invention have been shown and described, my invention is not limited to the specific arrangements shown. For example, although my invention in its specific aspects involves cubical blocks, the blocks 17 and 49 need not be cubical in accordance with the broader aspects of my invention. They may be parallelepipeds or of polygonal cross section in the plane perpendicular to one or the other of the dimensions. In its broadest aspects, my invention includes all equivalent embodiments and modifications which come within the scope of the appended claims.

I claim as my invention:

1. Game apparatus comprising at least 26 blocks, each in the form of a rectangular parallelepiped, each block having impressed, on at least one of two of its faces which are at right angles, a different letter of the alphabet and, on the other of said two faces, a word and a picture illustrating a different letter of the alphabet and on each of the faces parallel to said two faces at right angles a section of a unitary pattern, the sections on the different blocks being so related to said letters of the alphabet that when said blocks are arranged in an array with the letters in alphabetic sequence said sections combine to form a unitary pattern.

2. Game apparatus comprising a plurality of blocks, each in the form of a rectangular parallelepiped, each block having impressed, on at least one of two of its faces which are at right angles, a different letter of the alphabet and, on the other of said two faces, a word and a picture illustrating a different letter of the alphabet and on at least one of the faces parallel to said two faces at right angles a section of a unitary pattern, the sections on the different blocks being so related to said letters of the alphabet that when said blocks are arranged in an array with the letters in a predetermined sequence said sections combine to form a unitary pattern.

JACOB LEVIN.

REFERENCES CITED

The following references are of record in the file of this patent:

UNITED STATES PATENTS

| Number | Name | Date |
| --- | --- | --- |
| 146,875 | Crandall | Jan. 27, 1875 |
| 196,532 | Martin | Oct. 30, 1877 |
| 550,563 | Pierce, Jr. | Nov. 26, 1895 |
| 717,105 | Mansfield | Dec. 30, 1902 |
| 760,384 | Dieterich | May 17, 1904 |
| 853,756 | Betis | May 14, 1907 |
| 979,923 | Boore et al. | Dec. 27, 1910 |
| 1,359,115 | Sittinger | Nov. 16, 1920 |
| 1,469,554 | Crowder | Oct. 2, 1923 |
| 1,477,322 | Degheri | Dec. 11, 1923 |
| 1,636,371 | Kenney | July 19, 1927 |
| 1,694,405 | Troidl | Dec. 11, 1928 |
| 1,773,926 | Michael | Aug. 26, 1930 |
| 1,869,839 | Boulard | Aug. 2, 1932 |
| 2,386,114 | Hayes | Oct. 2, 1945 |